US007694729B2

(12) United States Patent
Uemura

(10) Patent No.: US 7,694,729 B2
(45) Date of Patent: Apr. 13, 2010

(54) AIR PASSAGE OPENING/CLOSING DEVICE

(75) Inventor: Yukio Uemura, Nagoya (JP)

(73) Assignee: Denso Corporation, Kariya (JP)

( * ) Notice: Subject to any disclaimer, the term of this patent is extended or adjusted under 35 U.S.C. 154(b) by 394 days.

(21) Appl. No.: 11/001,501

(22) Filed: Dec. 1, 2004

(65) Prior Publication Data
US 2005/0142999 A1   Jun. 30, 2005

(30) Foreign Application Priority Data
Dec. 2, 2003   (JP)   ............... 2003-402908

(51) Int. Cl.
*B60H 1/00*   (2006.01)
(52) U.S. Cl. .................. 165/203; 165/42; 165/202; 454/121; 454/169
(58) Field of Classification Search .................. 62/187, 62/405; 165/42, 43, 49.3, 103, 202, 203, 165/204, 222, 236; 454/121, 156, 159, 160; 236/49.3
See application file for complete search history.

(56) References Cited

U.S. PATENT DOCUMENTS

| | | | | |
|---|---|---|---|---|
| 6,044,656 | A * | 4/2000 | Shirota et al. ................. | 62/244 |
| 6,079,484 | A * | 6/2000 | Uemura et al. ................ | 165/42 |
| 6,213,198 | B1 * | 4/2001 | Shikata et al. ............... | 165/202 |
| 6,293,339 | B1 * | 9/2001 | Uemura et al. ............... | 165/203 |
| 6,296,562 | B1 * | 10/2001 | Uemura et al. ............... | 454/121 |
| 6,450,246 | B1 | 9/2002 | Kurokawa et al. | |
| 6,508,703 | B1 * | 1/2003 | Uemura et al. ............... | 454/156 |
| 6,568,468 | B1 * | 5/2003 | Uemura et al. ............... | 165/203 |
| 6,609,563 | B1 | 8/2003 | Tsurushima et al. | |
| 6,612,922 | B2 * | 9/2003 | Uemura et al. ............... | 454/121 |
| 6,669,549 | B2 * | 12/2003 | Uemura et al. ............... | 454/156 |
| 6,688,964 | B2 * | 2/2004 | Uemura et al. ............... | 454/121 |
| 6,814,138 | B2 | 11/2004 | Tsurushima et al. | |
| 6,834,709 | B2 * | 12/2004 | Shirota et al. ................ | 165/43 |
| 6,926,068 | B2 * | 8/2005 | Ito et al. ..................... | 165/43 |
| 2001/0017204 | A1 * | 8/2001 | Shirota et al. ............... | 165/202 |
| 2002/0197951 | A1 * | 12/2002 | Uemura et al. ............... | 454/121 |
| 2003/0013404 | A1 * | 1/2003 | Uemura et al. ............... | 454/121 |
| 2003/0171091 | A1 * | 9/2003 | Uemura et al. ............... | 454/156 |

(Continued)

FOREIGN PATENT DOCUMENTS

JP   2001-097024   4/2001

(Continued)

OTHER PUBLICATIONS

Office action dated Feb. 17, 2009 in Japanese application No. 2003-402908.

(Continued)

*Primary Examiner*—Ljiljana (Lil) V Ciric
(74) *Attorney, Agent, or Firm*—Harness, Dickey & Pierce, PLC

(57) ABSTRACT

An air passage opening/closing device for a vehicle air conditioner has a casing and a slide door. The slide door is movably disposed in the casing. Both sides of the slide door are guided by guide channels provided in the casing. The guide channels are formed by the casing and a separate guide member. The slide door can be assembled by mounting the slide door on a door-sliding surface of the casing, and mounting the separate guide member on the slide door.

16 Claims, 8 Drawing Sheets

U.S. PATENT DOCUMENTS

2005/0142999 A1* 6/2005 Uemura .................. 454/152

FOREIGN PATENT DOCUMENTS

JP        2003-002033        1/2003

OTHER PUBLICATIONS

Office Action issued from Japan Patent Office dated Jun. 16, 2008 in the corresponding Japanese Patent Application No. 2003-402908 with English translation.

Office action dated Sep. 29, 2009 in corresponding Japanese application No. 2003-402908.

* cited by examiner

AIR PASSAGE OPENING/CLOSING DEVICE

CROSS REFERENCE TO RELATED APPLICATIONS

This application is based on Japanese Patent Application No. 2003-402908 filed on Dec. 2, 2003, the content of which is incorporated herein by reference.

BACKGROUND OF THE INVENTION

1. Field of the Invention

The present invention relates to an air passage opening/closing device for opening and closing an air passage using a slide door that moves along an opening of the air passage, and to a vehicle air conditioner that uses the air passage opening/closing device.

2. Description of Related Art

Some air passage opening/closing devices for opening and closing air passages are disclosed by the inventor in Japanese patent publications, such as JP-A-2003-2033, and JP-A-2003-28490. For example, one air passage opening/closing device has a slide door that uses a film member. In such a device, the film member is thrust while guided by guide channels of a resinous casing. This structure simplifies the air passage opening/closing device because a winding mechanism of the film member is not required.

The resinous casing has an internal air passage. The casing has separate right and left side casings in the film member moving direction (door moving direction). Each separate casing has an integral narrow guide channel that guides both ends of the film member in the width direction.

The publications do not disclose the assembly method of the device in detail. However, the assembly of the device may be difficult because when the slide door is assembled, the film member has to be inserted into the narrow guide channels, which are integrally formed in the casings.

SUMMARY OF THE INVENTION

An object of the present invention is to provide an air passage opening/closing device that is simple to assemble.

According to one aspect of the present invention, the air passage opening/closing device has a casing, a slide door, a driving device, and a separate guide member. The casing defines an air passage, and the casing has a first casing and a second casing. The slide door is movably disposed in the casing to open and close the air passage. The driving device moves the slide door. The separate guide member is separately prepared from the casing. The separate guide member has a first door-sliding surface. The casing has a second door-sliding surface. The first door-sliding surface of the separate guide member and the second door-sliding surface of the casing define a guide channel that movably guides both sides of the slide door.

Since the guide channel is defined by a combination of the separate guide member and the casing, the slide door can be assembled by a simple process. The simple process includes, for example, a step that the slide door is mounted on the second door-sliding surface of the casing, and another step that the separate guide member is mounted on the slide door.

Accordingly, it is not required to have a difficult assembly process, such as an insert process in which both sides of the slide door in the width direction are inserted into guide channels.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
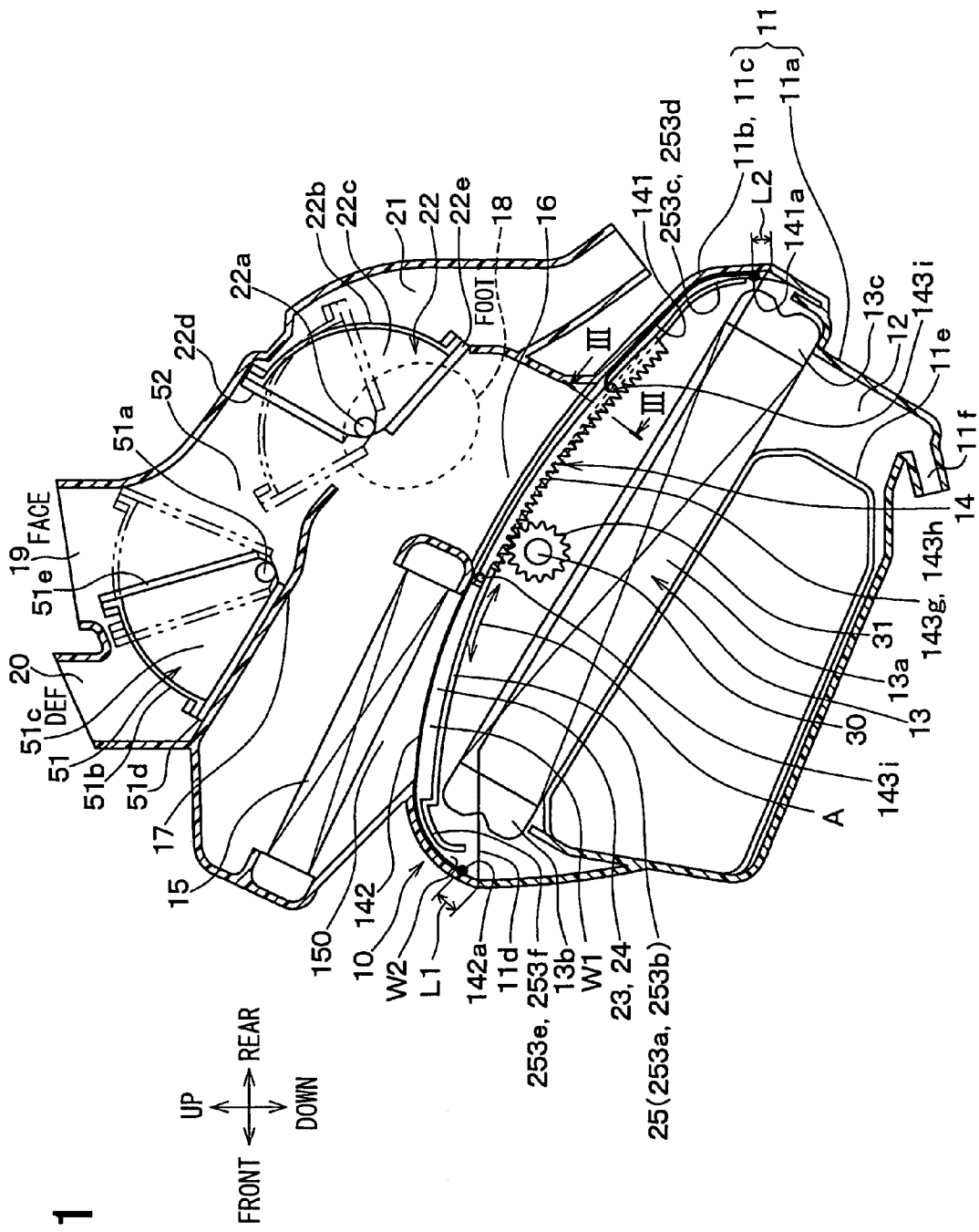
FIG. 1 is a cross-sectional view showing an air conditioning unit according to an embodiment of the present invention.

The preferred embodiments of the present invention will be explained with reference to the accompanying drawings. In the drawings, the same numerals are used for the same components and devices.

Figure 2:
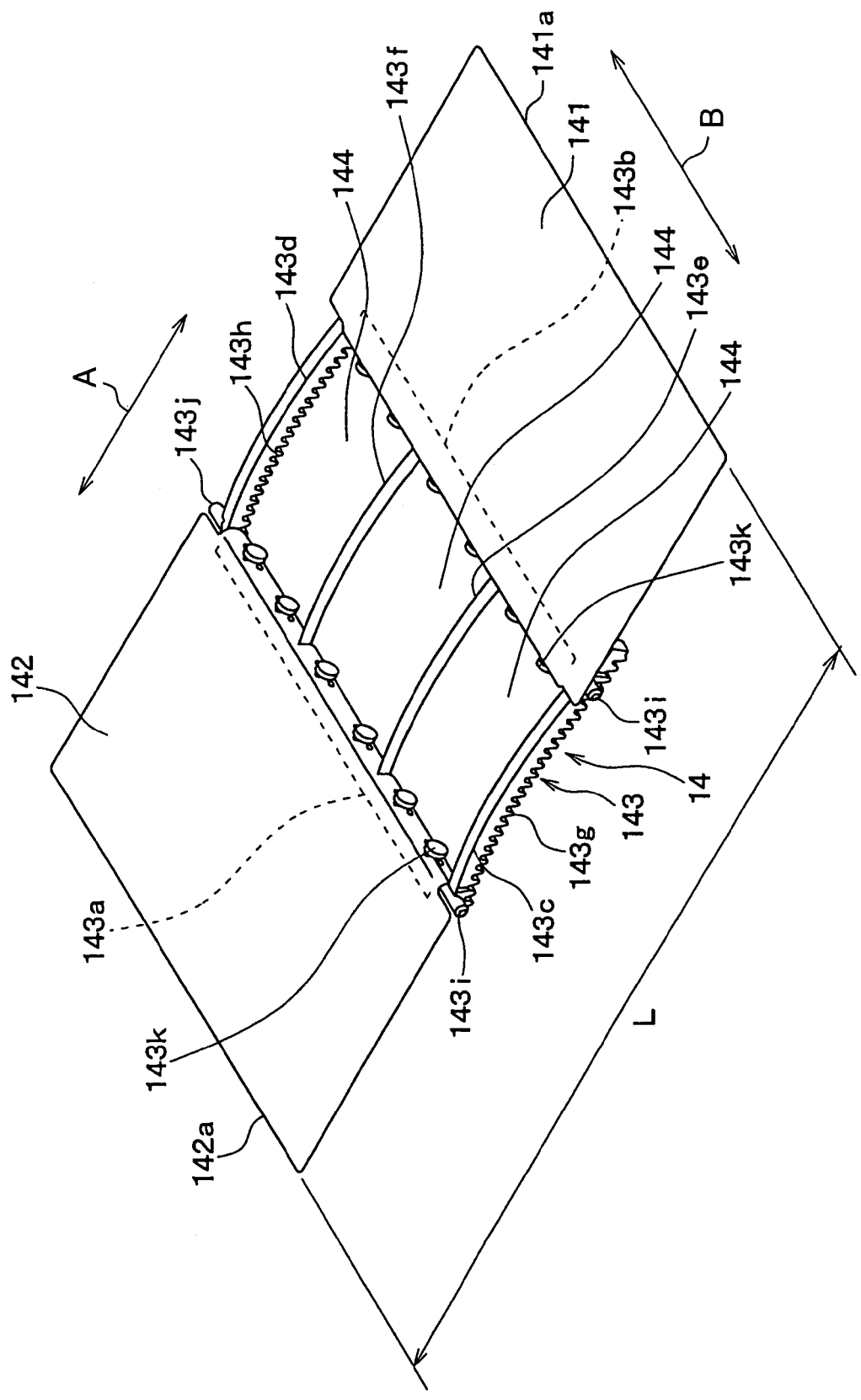
FIG. 2 is a perspective view of an air-mixing slide door according to the embodiment.

FIG. 1 depicts an air conditioning unit 10 that houses a heat exchanger unit. The air conditioning unit 10 is included in an in-vehicle unit of a vehicle air conditioner according to this embodiment. FIG. 2 shows a perspective view of an air-mixing slide door, which is included in the air conditioning unit 10 shown in FIG. 1.

The air conditioning unit 10 is disposed in the vicinity of a central position of a right-left (width) direction of a vehicle in an instrument panel (not shown). The instrument panel is disposed in a front section of a passenger compartment. Arrows pointing vertically (up and down) and horizontally (front and rear) in FIG. 1 indicate directions within the vehicle in which the air conditioning unit 10 is installed. The in-vehicle unit of the vehicle air conditioner is roughly divided into the air conditioning unit 10 and a blower unit (now shown). As described above, the air conditioning unit 10 is placed in the vicinity of a central position. The blower unit is disposed in the instrument panel at an offset position shifted from the central position to a front passenger's seat.

The blower unit has an inside/outside air switching box and a centrifugal motorized blower. The inside/outside air switching box switches and introduces outside air (the air outside the passenger compartment) or inside air (the air inside the passenger compartment). The blower blows air that is introduced by the air switching box. The air blown by the blower unit flows into an air inlet space 12 that is provided at a lower portion in an air-conditioning casing 11 of the air conditioning unit 10.

The casing 11 is formed from a resin, such as polypropylene, which is flexible and mechanically strong. The casing 11 has a plurality of partial casings 11a, 11b, 11c. The partial casings 11a, 11b, 11c are individually formed. After that, the plurality of partial casings 11a, 11b, 11c are integrated into a single component as the casing 11. Accordingly, die releasing can be conveniently performed, and air conditioning components can be conveniently installed in the casing 11.

In detail, the casing 11 is divided into a lower casing 11a and upper casings 11b, 11c at a dividing surface (parting surface) 11d. The upper casings 11b, 11c are formed with two separate casings 11b, 11c. The upper casings 11b, 11c are divided into right side and left side casings 11b, 11c in the vicinity of the central position in the right-left (width) direction of the vehicle. The right-left direction of the vehicle is a direction perpendicular to the surface of the paper of FIG. 1.

The air inlet space 12 is formed inside the lower casing 11a. An air inlet opening 11e is located in the lower casing 11a at the sidewall of the front passenger side. The air blown by the blower unit flows through the air inlet opening 11e. An evaporator 13 used as a cooling heat exchanger is approximately horizontally disposed at an upper side of the air inlet space 12 in the casing 11 so that the evaporator 13 is slightly angled with respect to a horizontal plane.

Accordingly, the air blown by the blower unit first flows into the air inlet space 12, and then the air upwardly passes through the evaporator 13 from the air inlet space 12. As is well known, the evaporator 13 is a part of a refrigerant cycle for the vehicle air conditioner. In the refrigerant cycle, refrigerant is decompressed to be low-pressure refrigerant by a decompression device, such as an expansion valve. The low-pressure refrigerant flows into the evaporator 13. The low-pressure refrigerant is evaporated in the evaporator 13 by absorbing heat from air passing through the evaporator 13, so that the air passing through the evaporator 13 can be cooled. A drain hole 11f is formed at the lowest position of a bottom surface of the lower casing 11a so that condensed water generated at the evaporator 13 can be drained through the drain hole 11f.

An air-mixing slide door 14 is disposed above (downstream side of the airflow) the evaporator 13. The air-mixing slide door 14 uses flexible film members 141, 142. A hot-water type heater core 15 is disposed above (downstream side of the airflow) the air-mixing slide door 14. As is well known, the heater core 15 is a heating heat exchanger for heating air by using hot water (engine cooling water) from a vehicle engine as a heat source.

The heater core 15 is approximately horizontally disposed so that the heater core 15 is angled in the same manner as the evaporator 13. The heater core 15 is smaller than a cross-sectional area of an internal air passage of the casing 11. The heater core 15 is disposed in the casing 11 at an offset position toward the front side of the casing 11. By this arrangement, a cool air passage 16 is formed at a rear side of the heater core 15. The cool air from the evaporator 13 flows through the cool air passage 16 so that the cool air can bypass the heater core 15.

The air-mixing slide door 14 moves (reciprocates) in a vehicle front-rear direction A at a position between the evaporator 13 and the heater core 15. The slide door 14 adjusts a flow amount ratio of cool air passing through the cool air passage 16 to warm air passing through an air passage of the heater core 15, which is a warm air passage 150. Thus, the slide door 14 adjusts a temperature of air to be blown into the passenger compartment by adjusting the flow amount ratio of the cool air and the warm air. The air-mixing slide door 14 constitutes a means for adjusting the temperature of the air flowing into the passenger compartment.

The warm air, which has passed through the heater core 15, is guided toward a rear side of the vehicle by a warm-air guide wall 17, and is thereby directed to an air mixing compartment 18. The cool air passing through the cool air passage 16 and the warm air passing through the heater core 15 are mixed in the air mixing compartment 18. This provides conditioned air having a desired temperature.

The casing 11 has a face port 19, a defroster port 20, and a foot port 21 on an upper surface, which is a downstream end of the airflow within the casing 11. The face port 19 is disposed on the rear side of the upper surface. The defroster port 20 is disposed in front of the face port 19. The foot port 21 is disposed on a lower part of the upper surface of the casing 11 behind the face port 19.

The face port 19 is provided for blowing the conditioned air from the air mixing compartment 18 toward the upper body half of a passenger. The defroster port 20 is provided for blowing the conditioned air from the air mixing compartment 18 toward an inside surface of the windshield of a vehicle. The foot port 21 is provided for blowing the conditioned air from the air mixing compartment 18 toward the feet of the passenger.

The plurality of air outlet ports, which include the face port 19, the defroster port 20, and the foot port 21, are opened and closed by two blower mode selection doors 22, 51. The blower mode selection doors 22, 51 have a first blower mode selection door 22 and a second blower mode selection door 51. The doors 22, 51 have rotary doors that rotate about rotational shafts 22a, 51a, respectively.

The rotary doors have main door units. The main door units have outside walls 22b, 51b, sidewalls 22c, 51c, and elastic sealing members 22d, 22e, 51d, 51e. The main door units have gate shapes. The outside walls 22b, 51b have arc shapes. The sidewalls 22c, 51c have fan shapes. The sidewalls 22c, 51c integrate axial ends of the outside walls 22b, 51b with the rotational shafts 22a, 51a. One of the main door units has sidewalls 22c at its right and left sides. The other also has sidewalls 51c at its right and left sides. The main door units have resinous rigid members. The elastic sealing members 22d, 22e, 51d, 51e are provided at both circumferential ends of the main door units.

The first blower mode selection door 22 opens and closes the foot port 21 and a communicating passage 52. The solid line position of the door 22 shown in FIG. 1 describes a condition such that the foot port 21 is closed and the communicating passage 52 is opened. The double dotted and dashed line position of the door 22 is an intermediate opening position describing another condition in which the foot port 21 and the communicating passage 52 are both simultaneously opened.

When the door 22 is rotated a certain number of degrees in a counterclockwise direction from the double dotted and dashed line position, the door 22 closes the communicating passage 52 and the foot port 21 is fully opened. The communicating passage 52 connects the air mixing compartment 18 to either the face port 19 or the defroster port 20.

The second blower mode selection door 51 opens and closes the face port 19 and the defroster port 20. The solid line position of the door 51 describes a condition in which the face port 19 is opened and the defroster port 20 is closed. The double dotted and dashed line position of the door 51 describes another condition in which the face port 19 is closed and the defroster port 20 is opened.

One end of the rotational shaft 22a of the first blower mode selection door 22 protrudes from the casing 11. One end of the rotational shaft 51a of the second blower mode selection door 51 also protrudes from the casing 11. Both protrusive ends of the rotational shafts 22a, 51a are connected to respective door driving devices through suitable connection devices, such as link devices. Driving forces of the door driving devices are transformed to rotational force of the rotational shafts 22a, 51a, so that the doors 22, 51 can be rotationally driven.

The door driving devices for the doors 22, 51 may be either actuators using servomotors or manual operating devices manually operated by a driver and the passenger.

The air-mixing slide door 14 reciprocates along a curved path in the casing 11. The air-mixing slide door 14 uses the flexible film members (resinous film members) 141, 142 so as to be deformable along the curved path. Polyethylene terephthalate (PET) films are suitably used as specific materials of the film members 141, 142 because PET is a resinous material that is flexible and has low frictional resistance.

The film members 141, 142 have a very small thickness in a range from 100 to 250 μm, for example. By setting the thickness of the film members 141, 142 within the range, sufficient rigidity of the film members 141, 142 for moving can be ensured. In addition, the film members can be easily deformed along the curved shape of the curved path at a curved portion of the curved path (reciprocation path), so that substantial increase of operational force due to the bending of the film members 141, 142 can be inhibited.

Next, the slide door 14 will be described in detail. FIG. 2 illustrates the detailed structure of the slide door 14. As shown in FIG. 2, the slide door 14 has a support member 143 at a center area of the slide door 14 in the door moving direction A. The support member 143 has a frame shape so that air can pass through the support member 143.

The slide door 14 also has the film members 141, 142 at both front and rear ends of the support member 143 in the door moving direction A. The film members 141, 142 have film shapes that do not have an opening.

The support member 143 has a rigid body molded by resin such as polypropylene. The support member 143 has frame portions (frames) 143a-143d. The frame portions 143a, 143b extending in a door width direction B are disposed parallel to each other with a certain interval. The frame portions 143a, 143b are joined to the frame portions 143c, 143d extending in the door width direction A in the vicinities of both ends of the frame portions 143a, 143b in the longitudinal direction. Accordingly, the frame portions 143a-143d form a rectangular frame. The door width direction B is perpendicular to the door moving direction A.

Two reinforcing ribs 143e, 143f extending in the door moving direction A are disposed at intermediate positions of the two frame portions 143a, 143b in the longitudinal direction. The frame portions 143a-143d and the reinforcing ribs 143e, 143f are integrally molded by resin. The support member 143 is formed in an arc shape along the door moving direction A. The frame portions 143a-143d define an opening 144 through which air passes. The opening 144 is divided into three opening portions by the reinforcing ribs 143e, 143f.

The support member 143 functions as a rigid member to transfer operational force (driving force) to the film members 141, 142. To transfer the operational force to the film members, driven gears (racks) 143g, 143h are integrally formed on the bottom surfaces of the frame portions 143c, 143d. The driven gears 143g, 143h are formed in the door moving direction A. Each gear 143g, 143h is a driven gear. The gears 143g, 143h are formed to have arc shapes along the arc shape frame portions 143c, 143d.

Figure 3:
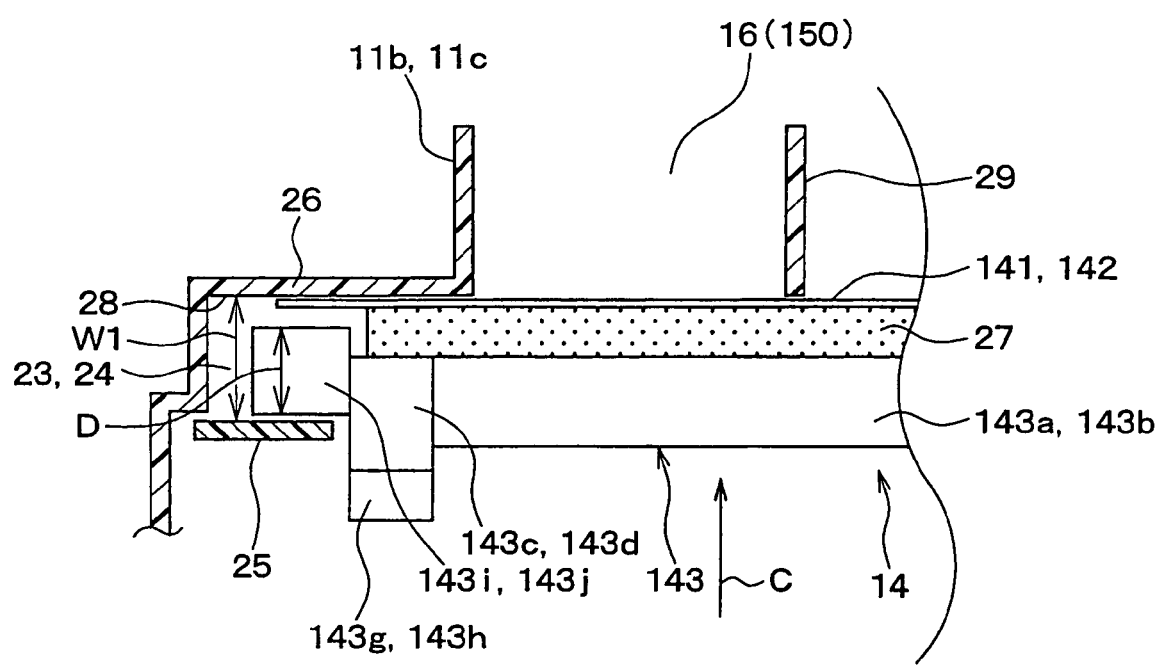
FIG. 3 is a cross-sectional view taken along line III-III in FIG. 1.

The frame portions 143a, 143b, which extend in the door width direction B, have cylindrical guide pins 143i, 143j respectively at their ends in their longitudinal directions. The guide pins 143i, 143j protrude from both ends of the support member 143 in the door width direction B. The guide pins 143i, 143j are slidably inserted in guide channels 23, 24 provided in the casing 11 as shown in FIGS. 1, 3. The guide channels 23, 24 will be described later in detail.

Each of the frame portions 143a, 143b has a plurality of (e.g. six in FIG. 2) attachment pins 143k at certain intervals in the longitudinal direction of the frame portions 143a, 143b. The attachment pins 143k are provided on surfaces of the frame portions 143a, 143b that face the opening 144. The film members 141, 142 have attachment holes (not shown) around each end. Enlarged head portions of the attachment pins 143k are attached into the attachment holes so that the film members 141, 142 can be connected to the support member 143.

Accordingly, one end portion of each film member 141, 142 can be connected to the support member 143. The other end portion of each film member 141, 142 is free from the support member 143.

At a position of line III-III in FIG. 1, the film members 141, 142 and guide pins 143i, 143j are not positioned, and only the support member 143 is positioned. Although FIG. 3 is a cross-sectional view taken along the line III-III in FIG. 1, FIG. 3 shows a different condition such that the film members 141, 142, guide pins 143i, 143j as well as the support member 143 are positioned at the position of the line III-III so that the structure can be easily understood.

As shown in FIG. 3, the guide channels 23, 24 extending in the door moving direction A are provided at right and left sides of an inner wall surface of the upper casings 11b, 11c, which is lower than the cool air passage 16. As shown in FIG. 1, central regions of the guide channels 23, 24 in the vehicle front-rear direction (the door moving direction A) extend approximately in the horizontal direction.

Although FIG. 3 shows the cool air passage 16 side of the guide channels 23, 24, the guide channels 23, 24 are similarly provided at the warm air passage 150 side. Because the guide channels 23, 24 are provided at both right and left sides of the upper casings 11b, 11c, one side of the guide channels 23, 24 is expressed by numeral 23, and the other side is expressed by numeral 24.

In detail, the guide channels 23, 24 are grooves provided between a separate guide member 25 and a guide wall 26. The guide member 25 is positioned upstream in the airflow direction C. The guide wall 26 is positioned downstream in the airflow direction C. The guide wall 26 provided downstream is formed integrally with the upper casings 11b, 11c. The guide member 25 is independently formed from the upper casings 11b, 11c. The guide member 25 is molded by resin.

As shown in FIG. 3, in a condition that the slide door 14 is installed in the casing 11 (upper casings 11b, 11c), the support member 143 is positioned upstream in the airflow direction C, and the film members 141, 142 are positioned downstream. As shown in FIG. 2, only one end of each of the film members 141, 142 in the door moving direction A is attached to the support member 143.

Therefore, when the film members 141, 142 receive wind pressure in the airflow direction C, the film members 141, 142 are pressed to a casing side door-sliding surface (seal surface) 28 that is an inside surface of the guide wall 26. The door-sliding surface 28 is formed on peripheral wall portions in the door moving direction A. The peripheral wall portions define the opening portions of the cool air passage 16 and the warm air passage 150.

As shown in FIG. 3, an elastic member 27 is firmly fixed to the frame portions 143a, 143b. The film members 141, 142 are pushed to the door-sliding surface 28 by the elastic force of the elastic member 27 so that sealing performance by the film members 141, 142 can be improved. A grid 29 is integrally provided with the upper casings 11b, 11c. The grid 29 inhibits the film members 141, 142 from bending due to the air pressure.

The slide door 14, which has the film members 141, 142 and the support member 143, is guided by the guide channels 23, 24 to be slidable in the door moving direction A. In FIG. 3, each channel space width W1 of the guide channels 23, 24 is set to be larger than a radial dimension D of the guide pins 143i, 143j in a moving area of the guide pins 143i, 143j of the support member 143. The moving area is a first area under a whole opening area of both passages 16, 150, which are the cool air passage 16 and the warm air passage 150 shown in FIG. 1. Accordingly, the guide pins 143i, 143j are supported by the guide channels 23, 24 so that the guide pins 143i, 143j are slidable.

On the other hand, in the guide channels 23, 24, the guide pins 143i, 143j do not move in a second area at vehicle front and rear sides relative to the first area, which is the moving area of the guide pins 143i, 143j. Only the film members 141, 142 move in the second area. Thus, in the second area, both ends of the film members 141, 142 in the door width direction B are only supported by the guide channels 23, 24 to be slidable in the channels 23, 24.

Accordingly, another channel space width W2 of the guide channels 23, 24 in the second area, which is at the vehicle front and rear sides relative to the moving area of the guide pins 143i, 143j, is not required to be larger than the radial dimension D of the guide pins 143i, 143j. Thus, at the guide channels 23, 24, the channel space width W2 in the second area is set to be smaller than the channel space width W1 in the first area, which is the moving area as shown in FIG. 1.

A door driving shaft 30 is disposed in the casing 11 in the door width direction (vehicle right-left direction) B at a position that is just under the slide door 14 and in the vicinity of a middle of the casing 11 in the vehicle front-rear direction. Both ends of the door driving shaft 30 are rotatably supported by bearing holes 42, 43 provided in sidewalls of the casing 11 (as discussed later with FIGS. 7, 8).

Circular driving gears (pinions) 31 are integrated to the door driving shaft 30 by resin molding at positions corresponding to the gears 143g, 143h, which are formed on the lower surfaces of the frame portions 143c, 143d. The circular driving gears 31 engage with the gears 143g, 143h. The rotation of the door driving shaft 30 is transformed to sliding movement (reciprocation movement) of the slide door 14 by engagement between the circular driving gears 31 and the door gears 143g, 143h.

Next, the air conditioning unit 10 relating to an assembly method will be explained with reference to FIGS. 4-8.

Figure 4:
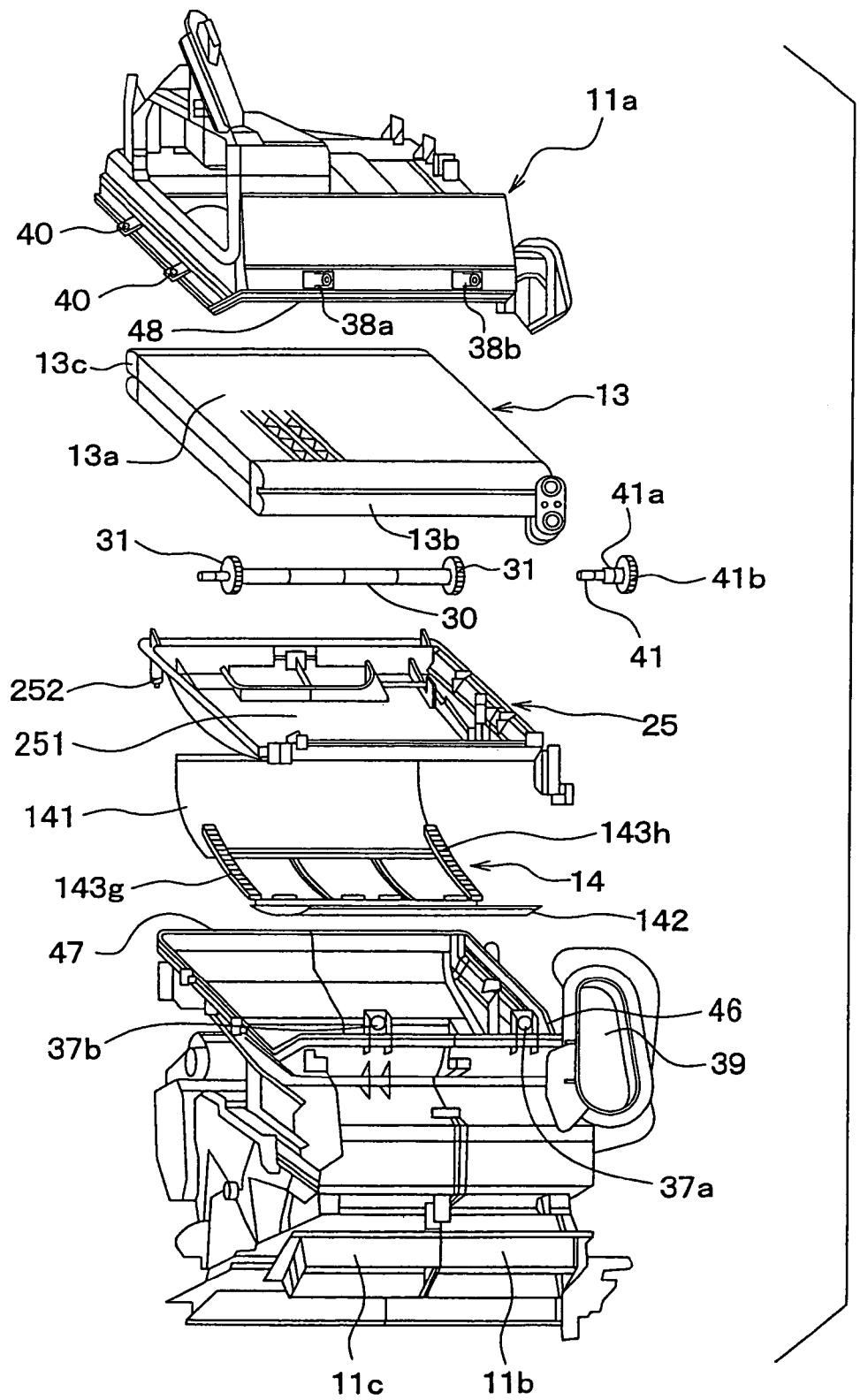
FIG. 4 is an exploded perspective view of the air conditioning unit that shows assembly order according to the embodiment.
Figure 5:
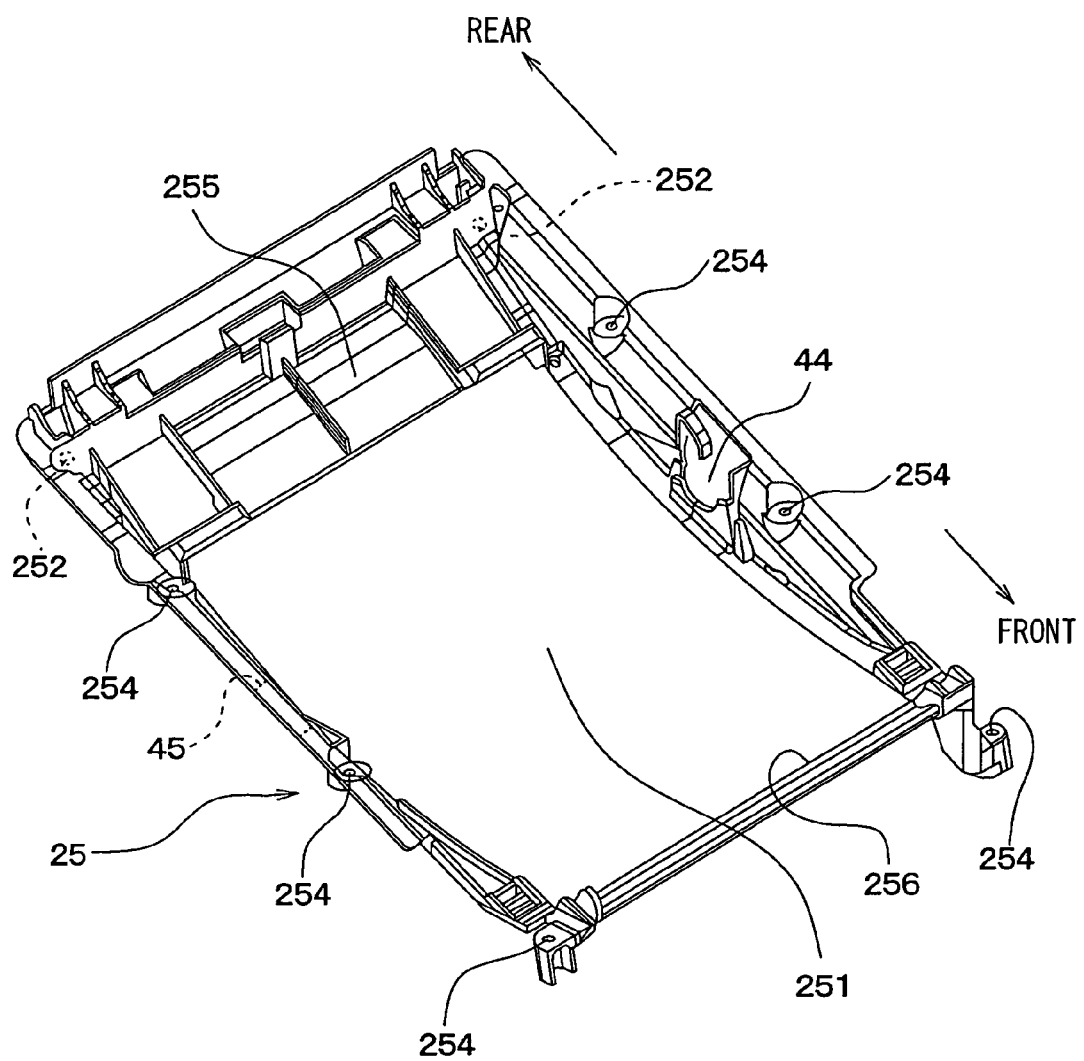
FIG. 5 is a perspective view of a separate guide member when viewed from the top of FIG. 4 according to the embodiment.
Figure 6:
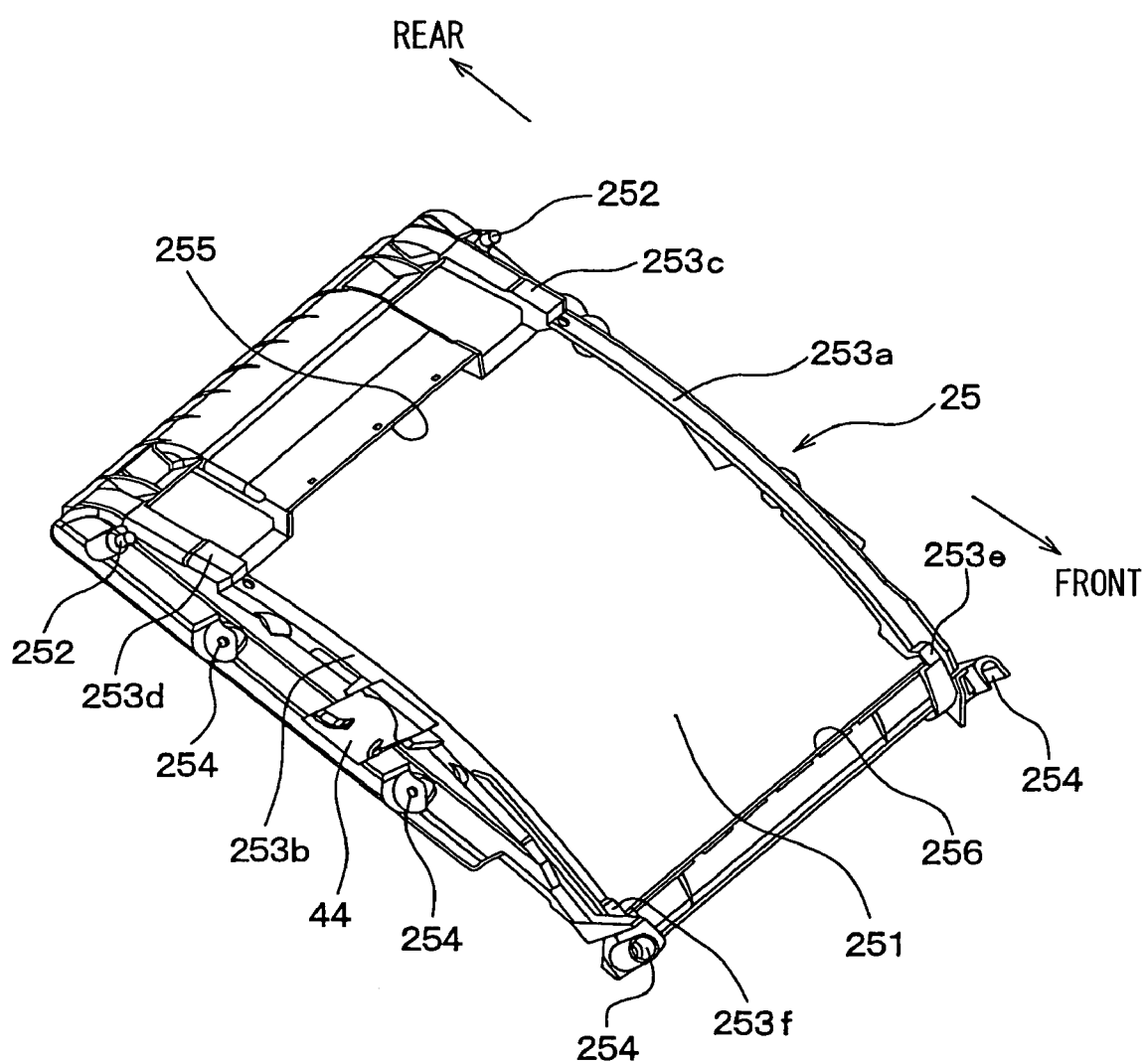
FIG. 6 is a perspective view of the separate guide member when viewed from the bottom of FIG. 4 according to the embodiment.

FIG. 4 is an exploded view of the air conditioning unit 10 depicting its assembly order. FIGS. 5 and 6 illustrate a perspective view of the separate guide member 25. In detail, FIG. 5 is a top perspective view of the guide member 25 when viewed from the top of FIG. 4 (viewed from the bottom of FIG. 1). FIG. 6 is a bottom perspective view of the guide member 25 when viewed from the bottom of FIG. 4 (viewed from the top of FIG. 1).

The separate guide member 25 has a rectangular frame shape that has a substantially rectangular opening 251 through which air can pass in the center of the guide member 25. Locating pins 252 are formed in the vicinity of both right and left sides of, and the vehicle rear side of, the rectangular frame shape guide member 25.

As shown in FIG. 6, guide member side main door-sliding surfaces 253a, 253b are formed at both right and left side frame portions extending in the vehicle front and rear direction in the rectangular frame shape guide member 25. The main door-sliding surfaces 253a, 253b are formed at areas corresponding to the moving area of the guide pins 143i, 143j. Guide member side secondary door-sliding surfaces 253c, 253d, 253e, 253f are formed to guide the film members 141, 142 at vehicular front and rear sides relative to the main door-sliding surfaces 253a, 253b.

Outer portions of the main door-sliding surfaces 253a, 253b in the vehicle right-left direction function as support walls. This is because the outer portions of the main door-sliding surfaces 253a, 253b are supported by guide member support walls 33a, 33b provided on the casings 11b, 11c.

Screw holes 254 for tapping screws are formed in the rectangular frame shape guide member 25 at six portions as shown in FIGS. 5 and 6. As shown in FIG. 6, two screw holes 254 are formed in the front and rear direction in each outer portion (vehicle right-left sides of the outer portions) of the main door-sliding surfaces 253a, 253b. That is, four screw holes 254 are formed, two in outer sliding surface 253a, two in outer sliding surface 253b. Two additional screw holes 254 are formed in the vicinity of both right and left sides of the vehicle front side of the rectangular frame shape guide member 25, for a total of six screw holes 254.

Figure 7:
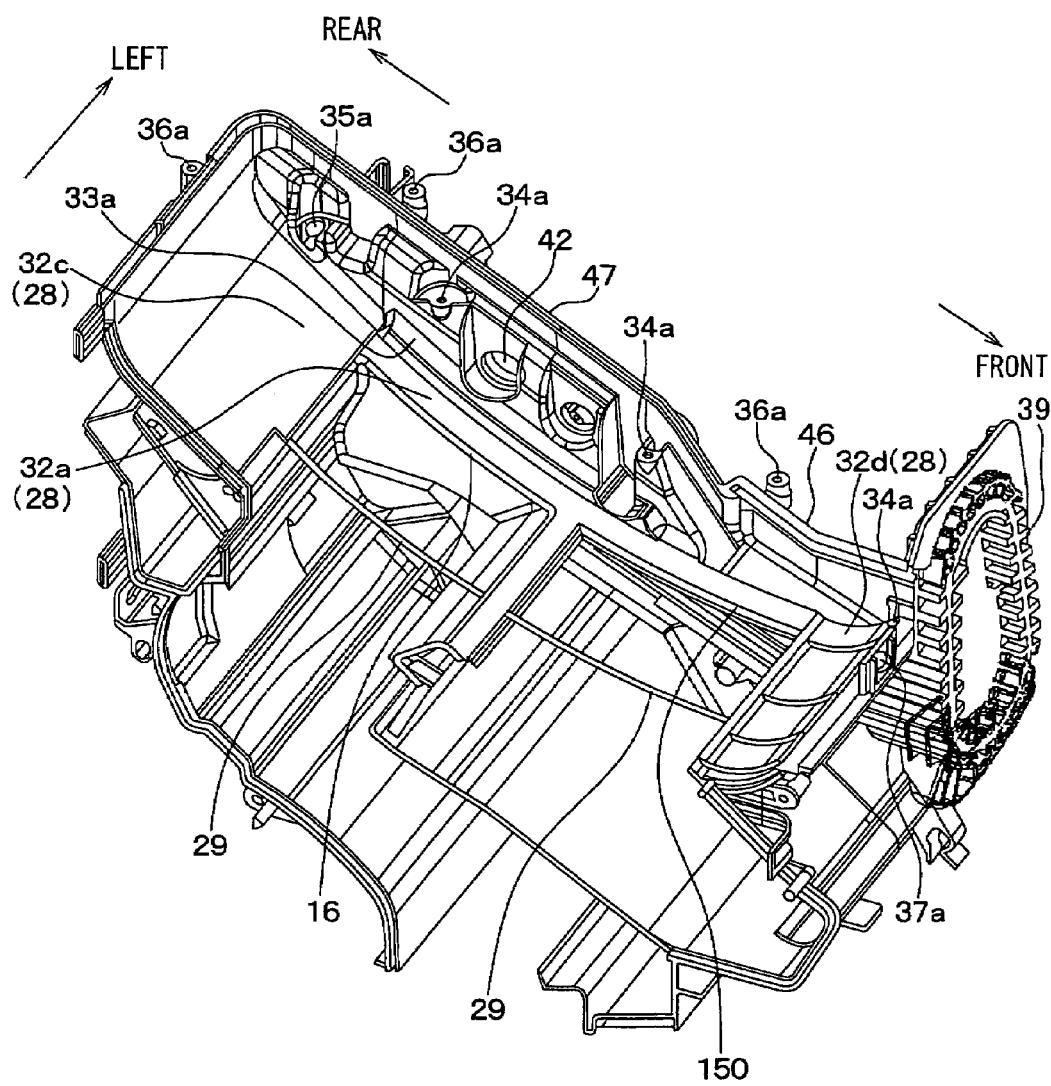
FIG. 7 is a top perspective view of the left side upper casing according to the embodiment.
Figure 8:
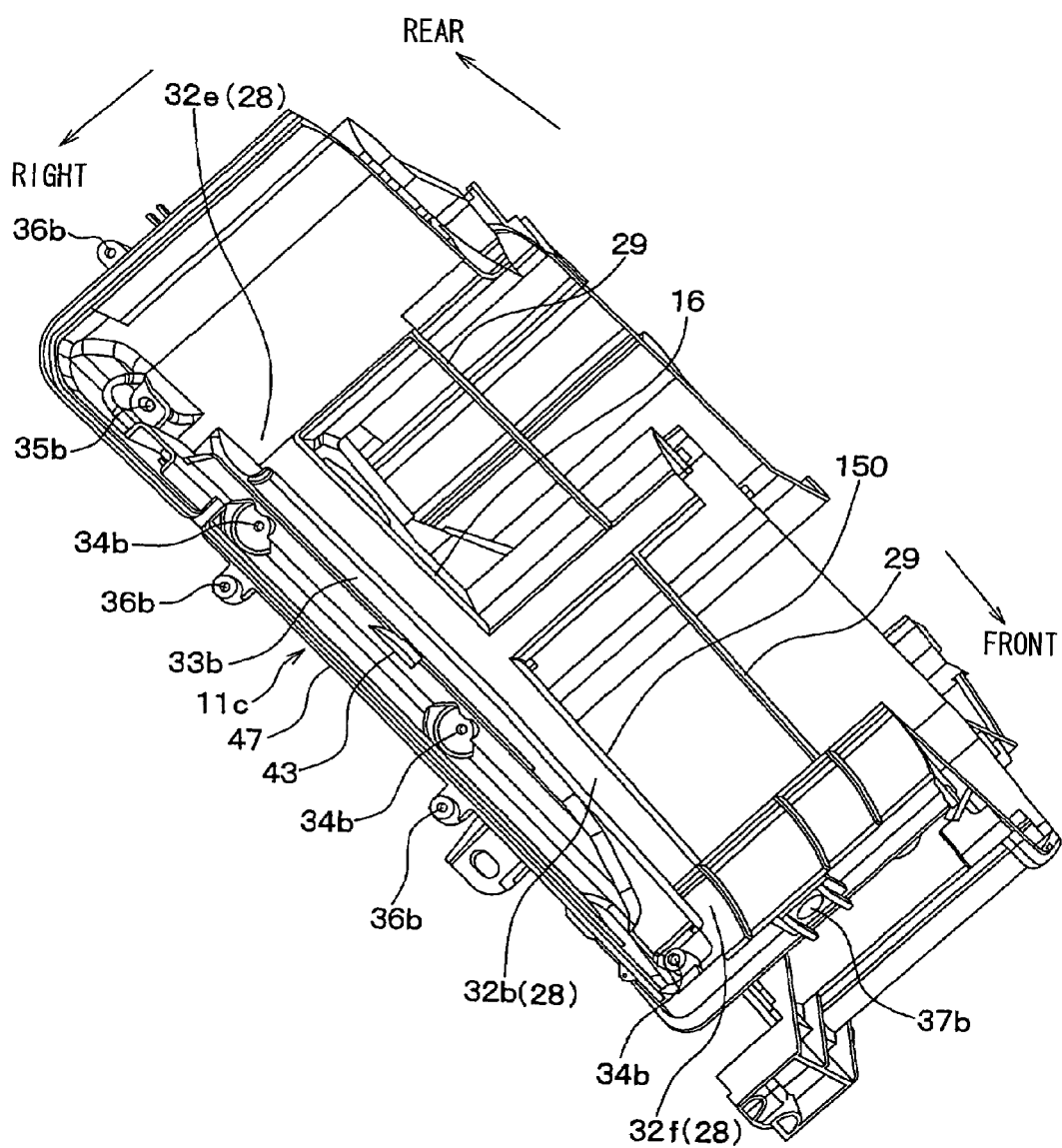
FIG. 8 is a top perspective view of the right side upper casing according to the embodiment.

Next, the left side upper casing 11b and the right side upper casing 11c will be explained with reference to FIGS. 7 and 8. FIG. 7 is a top perspective view of the left side upper casing 11b when viewed from the top of FIG. 4 (viewed from the bottom of FIG. 1). FIG. 8 is a top perspective view of the right side upper casing 11c when viewed from the top of FIG. 4 (viewed from the bottom of FIG. 1).

Casing side main door-sliding surfaces 32a, 32b extending toward the vehicle front-rear direction are formed in the vicinity of the ends in the vehicle right-left direction in the left side upper casing 11b and the right side upper casing 11c, respectively. The casing side main door-sliding surfaces 32a, 32b are formed to face the guide member side main door-sliding surfaces 253a, 253b. The casing side main door-sliding surfaces 32a, 32b guide the guide pins 143i, 143j, and film members 141, 142.

Casing side secondary door-sliding surfaces 32c, 32d, 32e, 32f are formed at front and rear sides relative to the main door-sliding surfaces 32a, 32b in the left side upper casing 11b and the right side upper casing 11c. The casing side secondary door-sliding surfaces 32c-32f are formed to face the guide member side secondary door-sliding surfaces 253c-253f. The casing side secondary door-sliding surfaces 32c-32f guide only the film members 141, 142.

At the left side upper casing 11b, the main door-sliding surface 32a and secondary door-sliding surfaces 32c, 32d consist of the casing side door-sliding surface 28 shown in FIG. 3. At the right side upper casing 11c, the main door-sliding surface 32b and secondary door-sliding surfaces 32e, 32f consist of the casing side door-sliding surface 28 shown in FIG. 3.

The guide member support walls 33a, 33b are formed in the left and right side upper casings 11b, 11c at outer portions relative to the main door-sliding surfaces 32a, 32b, respectively, in the vehicle right-left direction. The guide member support walls 33a, 33b are formed at an upper step in FIGS. 7 and 8 (at a lower step in FIG. 1) than the main door-sliding surfaces 32a, 32b. The guide member support walls 33a, 33b are connected with the outer portions of the guide member side main door-sliding surfaces 253a, 253b in the vehicle right-left direction. Thus, the guide member support walls 33a, 33b support the guide member side main door-sliding surfaces 253a, 253b.

Screw mounting holes 34a, 34b are formed in the left and right side upper casings 11b, 11c, respectively, at respective positions corresponding to the screw holes 254, which are provided at six positions in the guide member 25. The tapping screws are screwed in the screw mounting holes 34a, 34b. Three screw mounting holes 34a are formed in the left side upper casing 11b. Three other screw mounting holes 34b are formed in the right side upper casing 11c.

Pin insert holes 35a, 35b are formed in the left side upper casing 11b and the right side upper casing 11c, respectively. The pin insert holes 35a, 35b are provided at positions corresponding to the locating pins 252 formed in the guide member 25.

Other screw mounting holes 36a, 36b are formed in the left side upper casing 11b and the right side upper casing 11c, respectively, at three positions. Other tapping screws (not shown) for connecting the lower casing 11a with the upper casings 11b, 11c are screwed in the screw mounting holes 36a, 36b.

Each of the left side upper casing 11b and the right side upper casing 11c has a respective single insert hole 37a, 37b at the front end sides of the casings 11b, 11c. Hooks 38a, 38b of the lower casing 11a shown in FIG. 4 are inserted into the insert holes 37a, 37b, respectively. The hooks 38a, 38b are formed at the front end of the lower casing 11a.

The left side upper casing 11b has a refrigerant pipe mounting member 39 at the left end toward the front of the left side upper casing 11b. The refrigerant pipe mounting member 39 has an oval shape. The pipe mounting member 39 has an opening. A refrigerant pipe (not shown) for transporting refrigerant to/from the evaporator 13 is arranged from the passenger compartment to the engine compartment through the opening of the pipe mounting member 39 and a vehicle dashboard through hole (not shown).

As shown in FIG. 4, the lower casing 11a has through holes 40 for tapping screws. Although two through holes 40 are shown in FIG. 4, the lower casing 11a has six through holes 40 in total. The six through holes 40 are formed at positions corresponding to the respective six positions of the screw mounting holes 36a, 36b of the upper casings 11b, 11c.

The door driving shaft 30 has an insert hole (not shown) for inserting an auxiliary driving shaft 41 at one end of the door driving shaft 30, for example, at a left side end. An end of the auxiliary driving shaft 41 shown in FIG. 4 is inserted into the insert hole so that the driving shaft 30 and the auxiliary driving shaft 41 are integrally connected to each other. The auxiliary driving shaft 41 is made of resin. The auxiliary driving shaft 41 has an auxiliary shaft 41a and an auxiliary gear 41b that are integrally formed. The gear 41b is engaged with gears (not shown) of the door driving device. Thus, the driving shaft 30 and the auxiliary driving shaft 41 are integrally driven by the door driving device.

The door driving devices for the doors 22, 51 may be either actuators using servomotors or manual operating devices manually operated by the driver and the passenger.

As shown in FIG. 7, the left side upper casing 11b has a bearing hole 42 at its sidewall, specifically in the vicinity of the support wall 33a. The bearing hole 42 rotatably supports the auxiliary shaft 41a of the auxiliary driving shaft 41.

As shown in FIG. 8, the right side upper casing 11c has another bearing hole 43 at its sidewall. The bearing hole 43 rotatably supports another end (the right end of the vehicle) of the door driving shaft 30.

As shown in FIG. 5, the guide member 25 has shaft insert holes 44, 45 at the right and left side frame portions extending in the vehicle front-rear direction. The auxiliary driving shaft 41 can be freely inserted in the shaft insert hole 44. The right end of the driving shaft 30 can be freely inserted in the shaft insert hole 45.

Next, an assembly method of the air conditioning unit 10 will be explained. FIG. 4 is an exploded view of the air conditioning unit 10 that shows the assembly order. The parts shown in FIG. 4 are assembled in turn from lower parts to upper parts as shown in FIG. 4.

(1) First, the left side upper casing 11b and the right side upper casing 11c are connected as a single unit. At that time, the first and second blower mode selection doors 22, 51 are installed inside the left and right side upper casings 11b, 11c. The heater core 15 is not installed before the upper casings 11b, 11c are connected. This is because the heater core 15 is inserted into the upper casings 11b, 11c through an opening 46 (shown in FIGS. 4, 7) provided in the sidewall of the left side upper casing 11b after the upper casings 11b, 11c are assembled as the unit.

The left side upper casing 11b and the right side upper casing 11c are connected by a well-known connecting means, such as a screw means, for example, a tapping screw, or a metal spring clip. After connecting the upper casings 11b, 11c, the upper casings 11b, 11c are set so that a connecting surface 47 for connecting with the lower casing 11a is arranged upward as shown in FIG. 4.

(2) Next, the air-mixing slide door 14 is installed into the assembled upper casings 11b, 11c. In detail, the guide pins 143i, 143j of the support member 143 of the slide door 14 are put on the main door-sliding surfaces 32a, 32b of the upper casings 11b, 11c. The film members 141, 142 of the slide door 14 are put on the secondary door-sliding surfaces 32c-32f of the upper casings 11b, 11c.

As shown in FIG. 2, the total length L of the air-mixing slide door 14 is a total length in the door moving direction A. The total length L is set to be shorter than the total length of the door-sliding surface of the upper casings 11b, 11c. The total length of the casing side door-sliding surface 28 is the sum of the length of the main door-sliding surface 32a and the secondary door-sliding surfaces 32c, 32d of the upper casing 11b in the door moving direction A, or the sum of the length of the main door-sliding surface 32b and the secondary door-sliding surfaces 32e, 32f of the upper casing 11c in the door moving direction A.

In detail, reference numerals 141a, 142a shown in FIG. 1 correspond to reference numerals 141a, 142a shown in FIG. 2. The reference numerals 141a, 142a indicate the ends of the film members 141, 142, respectively. The total length L of the air-mixing slide door 14 is a length along an arc shape surface between the ends 141a, 142a.

On the other hand, the total length of the door-sliding surfaces of the upper casings 11b, 11c are longer than the total length L of the air-mixing slide door 14 by the length L1 plus the length L2 shown in FIG. 1. Practically, the lengths L1, L2 are preferably set to more than 2 mm. According to the length setting, the air-mixing slide door 14 can be installed in the upper casings 11b, 11c.

(3) Next, the separate guide member 25 is mounted on the air-mixing slide door 14 to be installed in the upper casings 11b, 11c. In detail, the two locating pins 252 formed in the guide member 25 are inserted into the two pin insert holes 35a, 35b of the upper casings 11b, 11c.

The separate guide member can be hereby located in the upper casings 11b, 11c. The outer portions of the main door-sliding surfaces 253a, 253b of the guide member 25 are supported by the guide member support walls 33a, 33b of the upper casings 11b, 11c.

At the same time, the six screw holes 254 of the guide member 25 are placed on the six screw mounting holes 34a, 34b of the upper casings 11b, 11c. Then, the tapping screws (not shown) are screwed into the screw mounting holes 34a, 34b through the screw holes 254, so that the guide member 25 can be fixed to the upper casings 11b, 11c.

According to the third process (3), the right side shaft insert hole 45 (shown in FIG. 5) of the separate guide member 25 is placed to face the bearing hole 43 (shown in FIG. 8) of the right side upper casing 11c. The left side shaft insert hole 44 (shown in FIG. 5) of the separate guide member 25 is placed to face the bearing hole 42 (shown in FIG. 7) of the right side upper casing 11b.

(4) Next, the door driving shaft 30 is installed in the upper casings 11b, 11c. In detail, both sides of the driving gears (pinions) 31 of the door driving shaft 30 are engaged with the gears 143g, 143h through the opening 251 of the guide member 25. At the same time, one end (right side) of the door driving shaft 30 is inserted in the bearing hole 43 (shown in FIG. 8) of the right side upper casing 11c through the shaft insert hole 45 (shown in FIG. 5) of the guide member 25. Thus, one end (right side) of the driving shaft 30 is rotatably supported by the bearing hole 43.

At the same time, the other end of the driving shaft 30 is located in a position where the insert hole (not shown) provided at the other end of the driving shaft 30 faces both the shaft insert hole 44 (shown in FIG. 5) of the guide member 25 and the bearing hole 42 (shown in FIG. 7) of the right side upper casing 11b.

During the assembly process of the driving shaft 30, the engagement between the driving gears 31 and the door gears 143g, 143h can be checked by visual inspection through the opening 251 of the separate guide member 25. Accordingly, the driving gears 31 can assuredly engage the door gears 143g, 143h.

The assembled position of the air-mixing slide door 14, which is assembled in the slide door assembly process (2), is adjusted with respect to the upper casings 11b, 11c after assembling the driving shaft 30 to the upper casings 11b, 11c. In other words, after the assembly of the driving shaft 30, the position of the slide door 14 is adjusted so that the slide door 14 can be correctly installed in the upper casings 11b, 11c by certain operations, such as rotational operation of the driving shaft 30, and manual adjustment of the support member 143 of the slide door 14.

(5) Next, the evaporator 13 is mounted on the separate guide member 25. As shown in FIG. 4, the evaporator 13 has a heat-exchanging core portion 13a and tanks 13b, 13c at the front and rear positions of the core portion 13a. As shown in FIGS. 5 and 6, the separate guide member 25 has support surfaces 255, 256 at the front and rear positions of the opening 251. Specifically, the tanks 13b, 13c of the evaporator 13 are mounted on the support surfaces 255, 256 of the guide member 25 in order to mount the evaporator 13 on the guide member 25.

The opening area of the opening 251 of the guide member 25 is designed to be equal to or larger than the area of the core portion 13a of the evaporator 13. This structure prevents airflow resistance from being increased because of the arrangement of the guide member 25.

(6) Next, the lower casing 11a is installed onto the upper casings 11b, 11c. In detail, the hooks 38a, 38b (FIG. 4) formed at the front end of the lower casing 11a are inserted into the insert holes 37a, 37b of the upper casings 11b, 11c to be hooked to the insert holes 37a, 37b. The connecting surface 47 (shown in FIGS. 4, 7, and 8) of the upper casings 11b, 11c are fitted to a connecting surface 48 (shown in FIG. 4) of the lower casing 11a.

Specifically, one of either connecting surfaces 47, 48 has a concavity, and the other has a convexity. The convexity is inserted into the concavity, so that the connecting surfaces 48 are fitted to each other. Accordingly, the through holes 40 can be located on the screw mounting holes 36a, 36b. The through holes 40 are formed at outward surfaces of the connecting surfaces 48 of the lower casing 11a. The screw mounting holes 36a, 36b are formed at outward surfaces of the connecting surfaces 47 of the upper casings 11b, 11c.

The tapping screws are screwed into the screw mounting holes 34a, 34b through the through holes 40, so that the lower casing 11a can be integrally connected to the upper casings 11b, 11c. At the same time, the evaporator 13 can be fixed between the lower casing 11a and the guide member 25.

(7) Finally, the auxiliary driving shaft 41 and the heater core 15 are installed. Here, the other end of the driving shaft 30 is located in the position where the insert hole (not shown) provided at the other end of the driving shaft 30 faces both the shaft insert hole 44 (shown in FIG. 5) of the guide member 25 and the bearing hole 42 (shown in FIG. 7) of the right side upper casing 11b in the door driving shaft installing process (4). Accordingly, a head portion of the auxiliary driving shaft 41 can be inserted into the insert hole of the driving shaft 30 through the bearing hole 42 and the shaft insert hole 44. Thus, the driving shaft 30 and the auxiliary driving shaft 41 can be integrally connected to each other.

The head portion of the auxiliary driving shaft 41 and the insert hole of the driving shaft 30 may have noncircular shapes. This can protect the auxiliary driving shaft 41 and the driving shaft 30 from rotating with respect to each other, and can integrally connect each other. The auxiliary shaft 41a of the auxiliary driving shaft 41 can be supported by the bearing hole 42.

The heater core 15 is inserted into the upper casings 11b, 11c through the opening 46 (shown in FIGS. 4 and 7) provided at the sidewall of the left side upper casing 11b to be installed in the upper casings 11b, 11c.

According to the embodiment, the guide channels 23, 24 are formed by a combination of the upper casings 11b, 11c and the separate guide member 25. The air-mixing slide door 14 can be assembled using a simple process in which the air-mixing door 14 and the guide member 25 are sequentially mounted on the upper casings 11b, 11c.

This improves assembly of the air-mixing slide door 14. In other words, it is not required or desirable to have a difficult assembly process, such as an insert process in which both ends of the film members 141, 142 in the door width direction B are inserted into different guide channels having a narrow width, for example, a few millimeters.

As described above, the air-mixing slide door 14 is installed inside the upper casings 11b, 11c, and the film members 141, 142 do not protrude from the connecting surface 47 of the upper casings 11b, 11c. This prevents the defect that the film members 141, 142 could be caught between the lower casing 11a and the upper casings 11b, 11c when they are assembled.

The film members 141, 142 are simply put on the upper casings 11b, 11c to install the slide door 14. This process reduces the possibility that the film members 141, 142 will become damaged if the film members 141, 142 are made from the flexible resinous material.

The present invention should not be limited to the embodiments discussed above and shown in the figures, but may be implemented in various ways without departing from the spirit of the invention.

For example, in the above embodiment, the auxiliary driving shaft 41 is connected to the driving shaft 30 after lower casing 11a is assembled to the upper casings 11b, 11c. However, the auxiliary driving shaft 41 may be connected to the driving shaft 30 immediately after the driving shaft 30 is installed. In such a process, the assembled position of the air-mixing slide door 14 is adjusted by the rotational operation of the auxiliary driving shaft 41 so that the slide door 14 can be correctly installed in the upper casings 11b, 11c before installing the evaporator 13.

In the above embodiment, the slide door 14 has the rigid support member 143 and the film members 141, 142, which are connected with the support member 143. However, the slide door 14 can be made from only a rigid material without film members 141, 142 as disclosed in JP-A-10-205872.

To the contrary, the slide door 14 can be made from a film member without the support member 143 as disclosed in JP-A-2002-079819 (U.S. Pat. No. 6,508,703).

In the above embodiment, the air passage opening/closing device is typically applied to a vehicle air conditioner. However, the embodiment can be applied widely to an air passage opening/closing device in various fields without being limited to a vehicle air conditioner.

What is claimed is:

1. An air passage opening/closing device comprising:
   a casing assembly that defines an air passage, the casing assembly having a first casing and a second casing that are connected integrally with each other;
   a slide door movably disposed in the casing assembly to open and close the air passage;
   a driving device that moves the slide door; and
   a guide member formed independently from the casing assembly and separate from the casing assembly to define with the casing assembly a guide channel at each of two sides of the slide door in a direction substantially perpendicular to a moving direction of the slide door, the slide door slidingly engaging the guide channel defined by the guide member and the casing assembly; wherein:
   the guide member has a first door-sliding surface, and the first casing has a second door-sliding surface, the slide door slidingly engaging the first and second door-sliding surfaces;
   the first door-sliding surface of the guide member and the second door-sliding surface of the first casing are located opposite to each other and define the guide channel that guides the two sides of the slide door;
   the guide member has an approximately rectangular frame portion that defines therein a substantially rectangular opening through which air passes the guide member;
   a total length (L) of the slide door in the moving direction is shorter than a total length of the second door-sliding surface of the first casing;
   the slide door is stacked on the second door-sliding surface of the first casing;
   the guide member is stacked on the slide door; and
   the second casing is stacked on the guide member.

2. The air passage opening/closing device according to claim 1, wherein:
   the guide member defines the first door sliding surface as a pair of first door-sliding surfaces, each of the first door-sliding surfaces extending in a moving direction of the slide door, at the two side ends of the guide member in a direction substantially perpendicular to the moving direction;
   the first casing defines the second door sliding surface as a pair of second door-sliding surfaces that correspond respectively to the first door-sliding surfaces; and
   the pair of first door-sliding surfaces and the pair of second door-sliding surfaces define the guide channel as a pair of guide channels that guide the two sides of the slide door.

3. The air passage opening/closing device according to claim 2, wherein the guide member is attached to the first casing using fasteners.

4. The air passage opening/closing device according to claim 2, wherein the guide member has a frame shape that has frames in a width direction and has an opening through which air passes, and
   the first door-sliding surface is formed on the frames of the guide member.

5. The air passage opening/closing device according to claim 2, wherein the slide door has a support member and a plurality of flexible film members integrally connected to the support member,
   the support member has a frame shape that has a second opening through which air passes, and has guide pins protruding from both sides of the support member in a width direction of the support member, and
   the guide channel movably guides the guide pins and both sides of the film members in the width direction.

6. The air passage opening/closing device according to claim 5, wherein both ends of the support member in a door moving direction are connected to the respective film members.

7. The air passage opening/closing device according to claim 5, wherein the driving device includes:
   driven gears formed on the support member extending along the moving direction of the slide door at both sides of the support member in the width direction of the support member,
   driving gears engaging with the driven gears, and
   a driving shaft integrally rotating with the driving gears.

8. The air passage opening/closing device according to claim 7, wherein the guide member has insert holes, and the driving shaft is rotatably supported by the first casing by being installed through the insert holes of the guide member.

9. The air passage opening/closing device according to claim 5, wherein a total length of the slide door in the door moving direction is shorter than a total length of the second door-sliding surface of the first casing in a door moving direction.

10. The air passage opening/closing device according to claim 2, wherein:
    the casing assembly is disposed to accommodate a heater core for heating air to be blown into a passenger compartment of a vehicle through the air passage of the casing assembly;
    the air passage includes a cool air passage through which air bypasses the heater core and a warm air passage through which warm air warmed by the heater core passes; and
    the slide door is an air mixing door that adjusts a flow ratio between an air amount passing through the cool air passage and an air amount passing through the warm air passage.

11. The air passage opening/closing device according to claim 2, wherein the guide member has an outer portion outside of the first door-sliding surface in a width direction that is perpendicular to a door moving direction, and the outer portion of the guide member contacts an outer portion of the first casing outside of the second door-sliding surface in the width direction to be supported by the first casing.

12. The air passage opening/closing device according to claim 2, wherein the slide door is sandwiched directly between the first casing and the guide member.

13. The air passage opening/closing device according to claim 2, wherein the guide member is sandwiched between the first and second casing assembly.

14. The air passage opening/closing device according to claim 2, wherein the guide member is releasably attached to the first casing of the casing assembly.

15. The air passage opening/closing device according to claim 2, further comprising an evaporator disposed within said casing assembly, said evaporator being in direct contact with said guide member.

16. The air passage opening/closing device according to claim 1, wherein the slide door is sandwiched between the second door-sliding surface of the first casing and the guide member, and the guide member is sandwiched between the slide door and the second casing.

* * * * *